(12) United States Patent
Wong et al.

(10) Patent No.: US 7,836,230 B1
(45) Date of Patent: Nov. 16, 2010

(54) MANAGING MULTIPLE HOST REQUESTS IN QUEUED COMMANDS THAT CORRESPONDS TO RECEIPT OF STORED ACKNOWLEDGEMENT COMMANDS FROM THE HOST

(75) Inventors: William C. Wong, Cerritos, CA (US); Huy Tu Nguyen, Laguna Hills, CA (US); Kha Nguyen, Anaheim, CA (US)

(73) Assignee: Marvell International Ltd., Hamilton (BM)

( * ) Notice: Subject to any disclaimer, the term of this patent is extended or adjusted under 35 U.S.C. 154(b) by 431 days.

(21) Appl. No.: 12/030,165

(22) Filed: Feb. 12, 2008

Related U.S. Application Data

(60) Provisional application No. 60/889,811, filed on Feb. 14, 2007.

(51) Int. Cl.
*G06F 3/00* (2006.01)
(52) U.S. Cl. .............................. 710/53; 710/52; 710/57; 711/105; 711/160; 711/162; 714/758; 714/762
(58) Field of Classification Search .................. 710/52, 710/53, 57; 711/105, 160, 162; 714/758, 714/762
See application file for complete search history.

(56) References Cited

U.S. PATENT DOCUMENTS

| | | | | |
|---|---|---|---|---|
| 5,136,592 A | * | 8/1992 | Weng | .......................... 714/762 |
| 5,386,405 A | * | 1/1995 | Fujiwara et al. | .......... 369/59.19 |
| 5,450,546 A | * | 9/1995 | Krakirian | ...................... 710/57 |
| 5,950,223 A | * | 9/1999 | Chiang et al. | ............... 711/105 |
| 6,092,231 A | * | 7/2000 | Sze | ............................ 714/758 |
| 6,185,640 B1 | * | 2/2001 | Ross | ........................... 710/53 |
| 6,201,655 B1 | * | 3/2001 | Watanabe et al. | ............. 360/53 |
| 6,279,089 B1 | * | 8/2001 | Schibilla et al. | ............. 711/162 |
| 6,330,626 B1 | * | 12/2001 | Dennin et al. | .................. 710/52 |
| 2006/0015654 A1 | | 1/2006 | Krantz et al. | .................. 710/5 |
| 2006/0015660 A1 | | 1/2006 | Nguyen et al. | ................ 710/52 |

* cited by examiner

*Primary Examiner*—Tammara Peyton (57) ABSTRACT

Management of requests from a host to an external storage medium. An execution queue stores commands to be executed, and each command corresponds to a request from the host for data. A holding queue stores executed commands until receipt of an acknowledgment from the host that the host has, e.g., received the data corresponding to the command from the external storage medium. An outgoing queue stores acknowledged commands and has a maximum storage limit. A counter is provided, and a separate logic block increments the counter when a command is stored in the execution queue and decrements the counter when an acknowledged command is deleted from the outgoing queue. The separate logic disables execution of commands stored in the execution queue when the value of the counter equals the maximum storage limit of the outgoing queue.

16 Claims, 7 Drawing Sheets

MANAGING MULTIPLE HOST REQUESTS IN QUEUED COMMANDS THAT CORRESPONDS TO RECEIPT OF STORED ACKNOWLEDGEMENT COMMANDS FROM THE HOST

CROSS-REFERENCE TO RELATED APPLICATION

This application claims the benefit of U.S. Provisional Patent Application No. 60/889,811, filed Feb. 14, 2007, the contents of which are hereby incorporated by reference as if fully stated herein.

FIELD

The present disclosure relates generally to data processing, and more specifically to processing data requests from a host to an external memory.

BACKGROUND

Storing and retrieving data from a hard disk or other storage media is essential to modern electronics. For example, a host (e.g., a host computer) typically stores large amounts of data in an external memory. As such, it is important to quickly and accurately process data requests from the host to the external memory.

Conventionally, multiple queues are typically used to simultaneously process multiple data requests from a host to an external memory. Use of multiple queues permits parallel processing of multiple data requests (or commands) in different stages of the queues, and does not require each command to be completely processed before a next command is processed (as in a serial processing system).

Nevertheless, problems with queue overload can arise in a multiple-queue system. For example, a command from a host is typically immediately loaded into a first-stage queue, and the command may be quickly transferred to a next-stage queue if an external acknowledgment is not required. In contrast, deletion of a command from a last-stage queue (or end-stage queue) may take relatively more time, since an acknowledgement is typically required from the host. Thus, if commands are not deleted from the last-stage queue as quickly (or at least at the same rate) as commands are transferred from the first-stage queue, the last-stage queue will overflow, resulting in loss of commands and data.

In one conventional method to address such an overflow problem, each queue includes an additional register that stores a "data tag" for each command, in which the data tag indicates the present status of the command. Using mathematical equations that are based upon the present state of each command and the number of commands in each queue, the multiple-queue system determines whether to temporarily halt the input of data requests into the multiple-queue system.

However, this conventional method has several disadvantages. For example, implementing data tags requires that the multiple-queue system evaluate the status of every command in each queue. This can lead to substantial additional processing and/or reduced speed. Moreover, the mathematical equations for computing movement of commands are generally complex, and significant additional control logic must typically be added to the multiple-queue system, along with additional registers and buffer areas to store the data tags. Furthermore, the increased complexity makes such a multiple-queue system more difficult to debug.

SUMMARY

The foregoing situation is addressed by providing management of multiple data requests in queued commands.

Thus, in one example aspect, data requests from a host for data stored in an external storage medium are managed. An execution queue stores one or more commands to be executed. Each command stored in the execution queue corresponds to a given request from the host for data. A holding queue stores one or more executed commands until receipt of an acknowledgment from the host. The acknowledgement indicates that the host has received the data corresponding to the executed command from the external storage medium. An outgoing queue stores one or more acknowledged commands until deletion, and has a maximum storage limit. A counter is provided, and a separate logic block increments a value of the counter when a command is stored in the execution queue, and decrements a value of the counter when an acknowledged command is deleted from the outgoing queue. The separate logic disables execution of commands stored in the execution queue when the value of the counter equals the maximum storage limit of the outgoing queue.

Since, in one implementation, data requests are disabled based solely on the number of commands that have been received and deleted, it is possible to reduce overflow of a command queue without the need for significant additional control logic, registers, or buffers. Moreover, since the disabling is based on the number of commands, each individual command does not need to be inspected, nor does each queue. Thus, management of the commands is faster, more efficient, and easier to debug.

In another example aspect, there is management of data requests from a host for data stored in an external storage medium. There are means for providing an execution queue which stores one or more commands to be executed. Each command stored in the execution queue corresponds to a given request from the host for data. There are also means for providing a holding queue which stores one or more executed commands until receipt of an acknowledgment from the host. The acknowledgement indicates that the host has received the data corresponding to the executed command from the external storage medium. In addition, there are means for providing an outgoing queue which stores one or more acknowledged commands until deletion, and which has a maximum storage limit. There are means for providing a counter, means for incrementing a value of the counter when a command is stored in the execution queue, and means for decrementing a value of the counter when an acknowledged command is deleted from the outgoing queue. There are also means for disabling execution of commands stored in the execution queue when the value of the counter equals the maximum storage limit of the outgoing queue.

In yet another example aspect, a computer-executable program stored on a computer-readable medium causes a computer to manage requests from a host for data stored in an external storage medium. The program causes the computer to configure a queue command system including an execution queue, a holding queue, and an outgoing queue, and the outgoing queue has a maximum storage limit. The program causes the computer to load one or more commands into to the execution queue, and each command loaded in the execution queue corresponds to a given request from the host for data. The program also causes the computer to execute a command stored in the execution queue, including transferring the executed command into the holding queue, and the holding queue stores the executed command until the host acknowledges receipt of data corresponding to the executed command. The program further causes the computer to transfer an acknowledged command from the holding queue to the outgoing queue upon the host acknowledging receipt of the data corresponding to the executed command, and to delete a command transferred into the outgoing queue in response to completion of a pre-determined action. The program also causes the computer to increment a value of a counter when a given command is loaded into the execution queue, to decrement the value of the counter when a given command is deleted from the outgoing queue, and to disable execution of commands loaded in the execution queue when the value of the counter equals the maximum storage limit of the outgoing queue.

A more complete understanding can be obtained by reference to the following detailed description and to the attached drawings.

DETAILED DESCRIPTION

Figure 1:
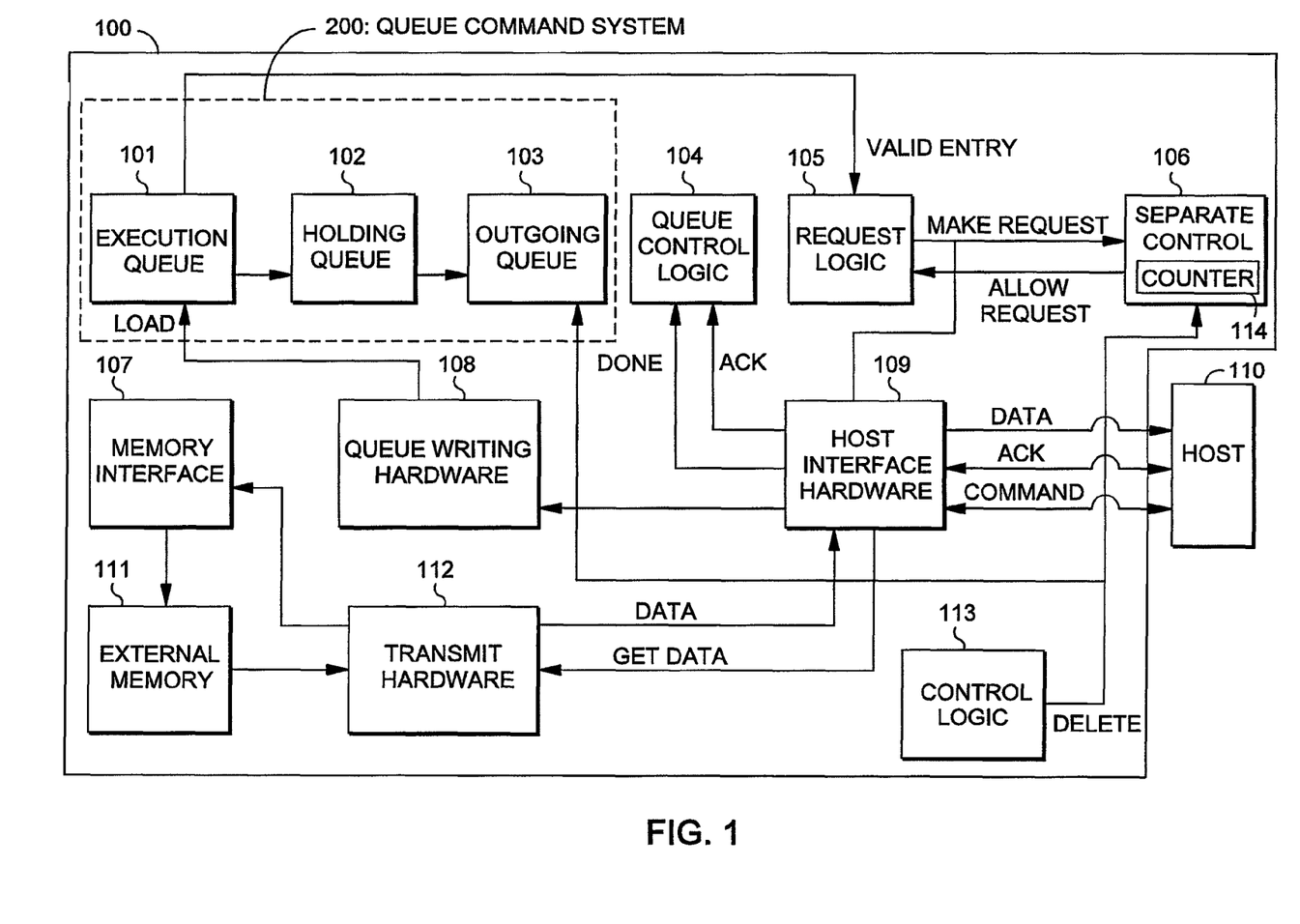
FIG. 1 is a block diagram of an example embodiment of a data transfer system including a queue command system.

FIG. 1 depicts a block diagram of an example embodiment of a data transfer system that includes a hard disk drive 100 and a host 110. Hard disk drive 100 includes a queue command system 200, which (in one implementation) comprises an execution queue 101, a holding queue 102, and an outgoing queue 103. As shown in FIG. 1, hard disk drive 100 also includes queue control logic 104, request logic 105, separate control 106, memory interface 107, queue writing hardware 108, host interface hardware 109, external memory 111, transmit hardware 112, and control logic 113. Separate control 106 further includes a counter 114.

Execution queue 101 is a command queue that stores commands. In one implementation, the commands are requests for data (or data requests) from host 110 to external memory 111. In other implementations, the commands can represent other types of commands from host 110 (e.g., requests to write data to external memory 111). In one implementation, when host 110 sends a command (e.g., a request for data), the command is loaded into execution queue 101 via queue writing hardware 108. In one implementation, a command may include additional information such as a number of blocks that are to be obtained, an address at which the requested blocks are located, and a format of the data. Successive commands are loaded into execution queue 101 from queue writing hardware 108 with each request from host 110. In one implementation, the commands in execution queue 101 are executed in a same order as the commands are received. In some implementations, the commands may be executed out of order.

Execution queue 101 is connected to holding queue 102, and (in one implementation) a command is transferred to holding queue 102 once the command has been executed. In one implementation, queue control logic 104 instructs transfer of a command from execution queue 101 to holding queue 102 when queue control logic 104 receives a signal (e.g., a DONE signal) indicating that host interface hardware 109 has received and executed the command.

Holding queue 102 is coupled to both execution queue 101 and outgoing queue 103. In one implementation, holding queue 102 serves as a temporary storage for executed commands in case the command fails. For example, requested data might fail to properly reach host 110 for a number of reasons, such as a transmission error or loss of power. Thus, holding queue 102 is provided as temporary back-up storage for executed commands, e.g., in the case that a data transfer fails.

Once host 110 issues an acknowledgment signal to indicate that requested data has been received without error, the corresponding command is removed from holding queue 102 and sent to outgoing queue 103. More specifically, (in one implementation) queue control logic 104 instructs transfer of a command from holding queue 102 to outgoing queue 103 when queue control logic 104 receives an acknowledgement signal (ACK signal) indicating that host 110 has successfully received data corresponding to the command.

In one implementation, outgoing queue 103 stores each command until other hardware (not shown) takes the necessary actions before deleting the command. In one implementation, various actions may need to be taken before a command can be deleted from outgoing queue 103. For example, each command may include an Originator Exchange ID (OXID)—i.e., in one implementation, each command is assigned a unique OXID, and any new command with a duplicate OXID is simply ignored or deleted. However, the total number of available OXIDs may be limited by external or internal factors. Thus, one necessary action taken by the hardware may be to delete an OXID of a command from memory, so that the OXID can be re-assigned to a new command. Other actions are possible. Once all necessary actions have been taken with respect to a command stored in outgoing queue 103, the command is deleted from outgoing queue 103.

Queue control logic 104 is a hardware and/or software-implemented logic block that controls the movement of commands throughout execution queue 101, holding queue 102, and execution queue 103 based upon various signals received from host interface hardware 109. More specifically, queue control logic 104 receives DONE and ACK signals from host interface hardware 109, as shown in FIG. 1, and controls movement of a command between execution queue 101, holding queue 102, and execution queue 103 based on a DONE or ACK signal.

In one implementation, the DONE signal indicates that host interface hardware 109 has executed a command from execution queue 101. Thus, in one implementation, a command is moved from execution queue 101 to holding queue 102 by queue control logic 104 when the DONE signal is received. In one implementation, the ACK signal indicates that host 110 has actually received data corresponding to a command, and is transmitted from host 110 to host interface hardware 109 for transmission to queue control logic 104. Thus, in one implementation, the DONE signal indicates execution of a command at host interface hardware 109, and the ACK signal indicates successful receipt of requested data at host 110.

In one implementation, a number of different hardware methods may be used to implement the actual physical transfer of commands through queue command system 200 based on instructions from queue control 104.

Request logic 105 is a hardware and/or software-implemented logic block that processes commands from execution queue 101. This process may include extracting additional data from a command, such as a number of blocks requested, an address in memory where those blocks are located, or other information (e.g., whether the data includes a CRC word for data protection). This data is then used to obtain the requested data from external memory 111 via host interface hardware 109.

In addition, upon receipt of a valid command, request logic 105 signals separate control 106 that a data request has been made. In response, separate control 106 increments counter 114, and may allow or deny the data request. In one implementation, counter 114 is used to regulate whether a command from execution queue 101 is to be executed. This process will be described in greater detail below.

Separate control 106 is a hardware and/or software-implemented logic block that governs the transmission of commands through queue command system 200. In one implementation, separate control 106 includes counter 114, in which counter 114 tracks incoming and deleted commands. Counter 114 can be implemented in hardware and/or software. Separate control 106 includes logic that increments counter 114 whenever, e.g., a data request is made from host 110, and decrements counter 114 whenever a command is deleted from outgoing queue 103. In one implementation, in order to detect new data requests from host 110 or deletion of a command from outgoing queue 103, request logic 105 transmits (to separate control 106) a signal indicating that a data request has been made, and control logic 113 transmits a signal (to separate control 106) indicating that a command has been deleted from outgoing queue 103.

As shown in FIG. 1, separate control 106 also issues a signal to request logic 105 indicating that a command stored in execution queue 101 can be executed. In one implementation, based on the value of counter 114, separate control 106 may allow additional commands to be executed from execution queue 101, or may temporarily prohibit further commands from being executed in order to avoid overflow of outgoing queue 103. In the embodiment shown in FIG. 1, separate control signal 106 sends an instruction to allow execution of a command, rather than an instruction to prohibit or disable a command from being executed. The signal could also be implemented as a prohibiting signal rather than an allowing signal.

Memory interface 107 communicates between external memory 111 and transmit hardware 112 to provide requested data to host 110. In one implementation, memory interface 107 is a hardware device that instructs external memory 111 to provide the requested data. Thus, for example, if external memory 111 is a hard disk, memory interface 107 may be embodied as the hardware that accesses the hard disk.

Queue writing hardware 108 is used to program a data request from host 110 as a command in execution queue 101. Thus, (in one implementation) queue writing hardware 108 receives a data request from host interface hardware 109, and converts the data request into a command including, for example, a number of blocks that are to be obtained, an address at which the requested blocks are located, and a format of the data, and then programs this command entry into execution queue 101. In other implementations, queue writing hardware 108 can convert other types of requests (e.g., a request to write data) into commands.

Host interface hardware 109 acts as an intermediary between host 110 and external memory 111. Host interface hardware 109 receives commands from execution queue 101 via request logic 105, obtains the requested data using transmit hardware 112, and transmits the requested data from external memory 111 to host 110. In one implementation, once request logic 105 has processed a command and extracted information necessary to obtain the requested data (e.g., the number of blocks and the address in external memory 111 where those blocks are located), the extracted information is sent to host interface hardware 109, which requests the data from external memory 111. Host interface hardware 109 issues a request including the extracted information received from request logic 105 to transmit hardware 112, which communicates with memory interface 107 to obtain the requested data from external memory 111. The requested data obtained from external memory 111 is transmitted to host interface hardware 109, and host interface hardware 109 transmits the requested data to host 110.

Additionally, host interface hardware 109 issues signals to queue control logic 104 in order to control movement of commands through execution queue 101, holding queue 102, and execution queue 103. As explained above, the DONE signal indicates execution of a command at host interface hardware 109, and the ACK signal indicates successful receipt of requested data at host 110. The DONE and ACK signals are sent to queue control logic 104 in order to manage movement of commands through the various queues of queue command system 200 in a process that will be described in more detail below.

In one implementation, host 110 is a host device which requests a number of data blocks from external memory 111, and receives the data blocks from external memory 111 via host interface hardware 109. Host 110 also transmits an ACK signal to host interface hardware 109 to indicate that the data blocks have been successfully received. While a common embodiment of host 110 is a computer, numerous other devices could function as a host device. For example, host 110 could be a digital video recorder, digital audio player, personal digital assistant, digital camera, video game console, mobile phone, or any other device that can be configured to access an external memory (e.g., external memory 111). In addition, host 110 could implement various disk interface protocols. For example, host 110 could be running hardware or software to implement Serial Attached Small Computer Interface ("SAS") or Fibre Channel ("FC") interface technology, or any number of other protocols.

External memory 111 stores data required by host 110. In one exemplary embodiment, external memory 111 is constructed as a series of disks, commonly abbreviated as a "hard disk" or "disk". The disk can be external to host 110 or be integrated within host 110. The disk is typically included in a hard disk drive that is used to read and write to the disk. While hard disk drives have traditionally been developed for use with computers, applications for hard disk drives have expanded to include digital video recorders, digital audio players, personal digital assistants, digital cameras, video game consoles, and mobile phones, and it is expected that the number of devices using hard disk drives will continue to expand as hard disk drive technology advances. In this regard, the physical embodiment of external memory 111 may differ according to the different embodiments of host 110 as described above.

While external memory 111 may be constructed as a series of disks, example embodiments may also be implemented relative to other types of storage media. For example, external memory 111 could be comprised of a CD/DVD drive, jump drive, floppy disk, magnetic tape, flash memory, optical storage or optical jukebox storage, holographic storage, phase-change memory, or an off-site network storage, among others.

Transmit hardware 112 is hardware interface which transmits requests from host interface hardware 109 to memory interface 107 to retrieve data blocks from external memory 111, and transmits the retrieved data blocks from external memory 111 to host interface hardware 109.

Control logic 113 is a hardware and/or software-implemented logic block for processing commands. In one implementation, control logic 113 deletes commands from outgoing queue 103. In one implementation, control logic 113 sends a delete signal to separate control 106 in order to regulate movement of commands throughout the queues. In one implementation, separate control 106 decrements counter 114 upon receiving the delete signal from control logic 113.

Figure 2:
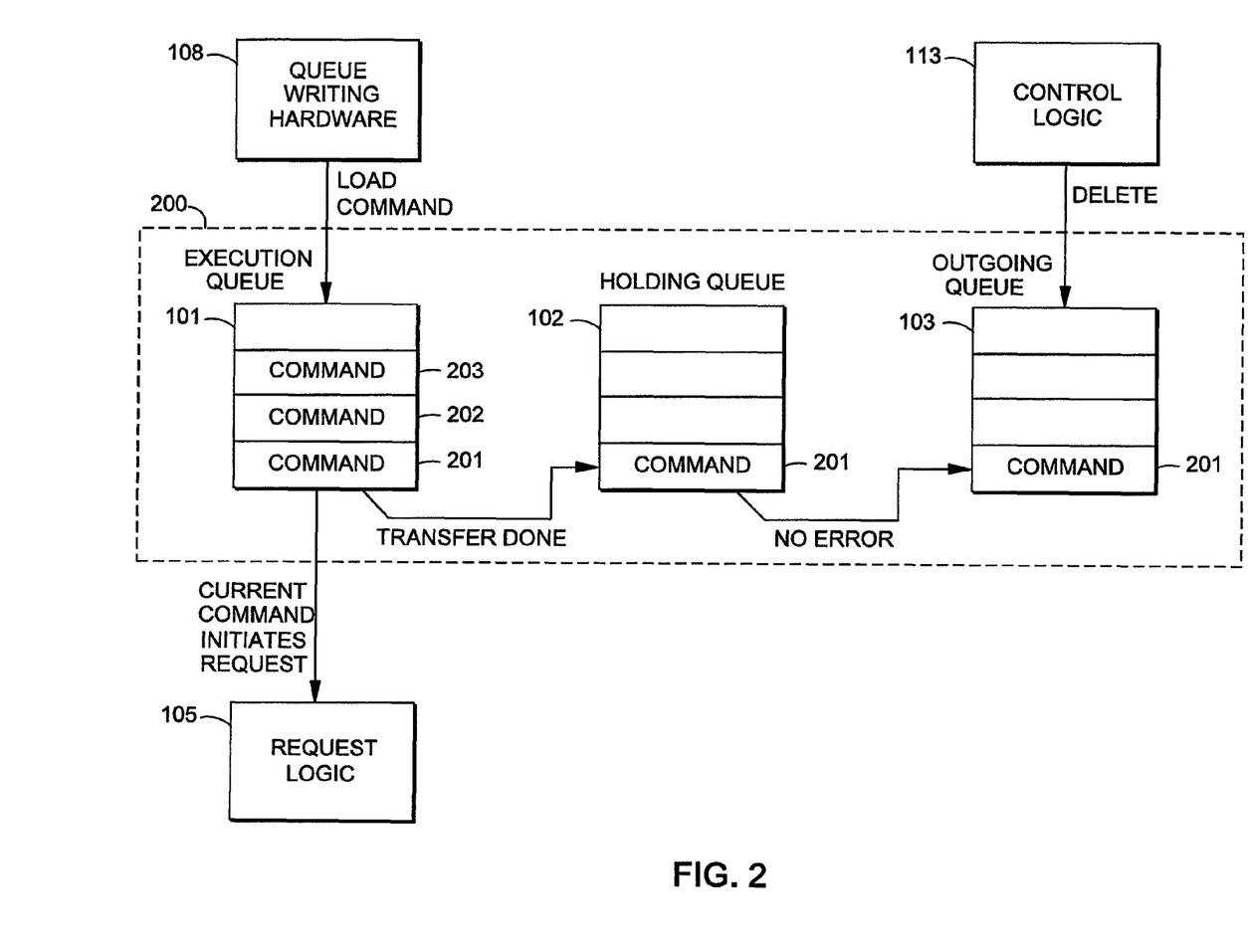
FIG. 2 is a block diagram showing an example progression of commands through the queue command system of FIG. 1.

FIG. 2 is a block diagram showing the progression of commands through queue command system 200 in the embodiment of FIG. 1.

More specifically, FIG. 2 depicts a close-up of execution queue 101, holding queue 102, and outgoing queue 103, which form queue command system 200.

In one implementation, each of execution queue 101, holding queue 102, and outgoing queue 103 is a FIFO (First In, First Out) queue. In a FIFO queue, each command loaded into the queue is "stacked" on top of a previous command, and the command that is located at the "bottom" of the queue is the command that is first executed, transferred, or deleted (depending upon which queue the command currently resides). Execution queue 101, holding queue 102, and/or outgoing queue 103 can be a different type of queue (e.g., a LIFO (Last In, First Out) queue).

In one implementation, commands are input (or loaded) into execution queue 101 as corresponding data requests are received from host 110 via queue writing hardware 108. In the example shown in FIG. 2, three commands (commands 201, 202, 203) have been loaded into execution queue 101. In one implementation, the command that is at the bottom of the queue—i.e., command 201—is first executed in order to initiate a request for data from external memory 111 (FIG. 1).

As shown in FIG. 2, once the command has been executed (as indicated by the DONE signal in FIG. 1), the executed command is moved from execution queue 101 to holding queue 102.

The command is stored in holding queue 102 until host 110 acknowledges receipt of the corresponding data without error. Once host 110 signals that the requested data corresponding to the command has been received without error (as indicated by the ACK signal in FIG. 1), the command is moved to outgoing queue 103.

At outgoing queue 103, the command is examined by other hardware in order to take any necessary actions. For example, as described above, hardware may delete an OXID of the command from memory, so that the OXID can then be re-assigned to a new command. The command is then deleted from outgoing queue 103. In one implementation, if there is any error in deleting the command from outgoing queue 103, system firmware (not shown) can intervene to perform error handling.

As indicated above, however, a situation can arise in which commands may be transferred into execution queue 101 at a faster rate than commands are being deleted from outgoing queue 103. This leads to an overflow of outgoing queue 103, which in turn can lead to errors in tracking commands and the flow of data to host 110.

Therefore, a process of managing multiple data requests in queue command system 200 will now be described with respect to FIG. 3.

Figure 3:
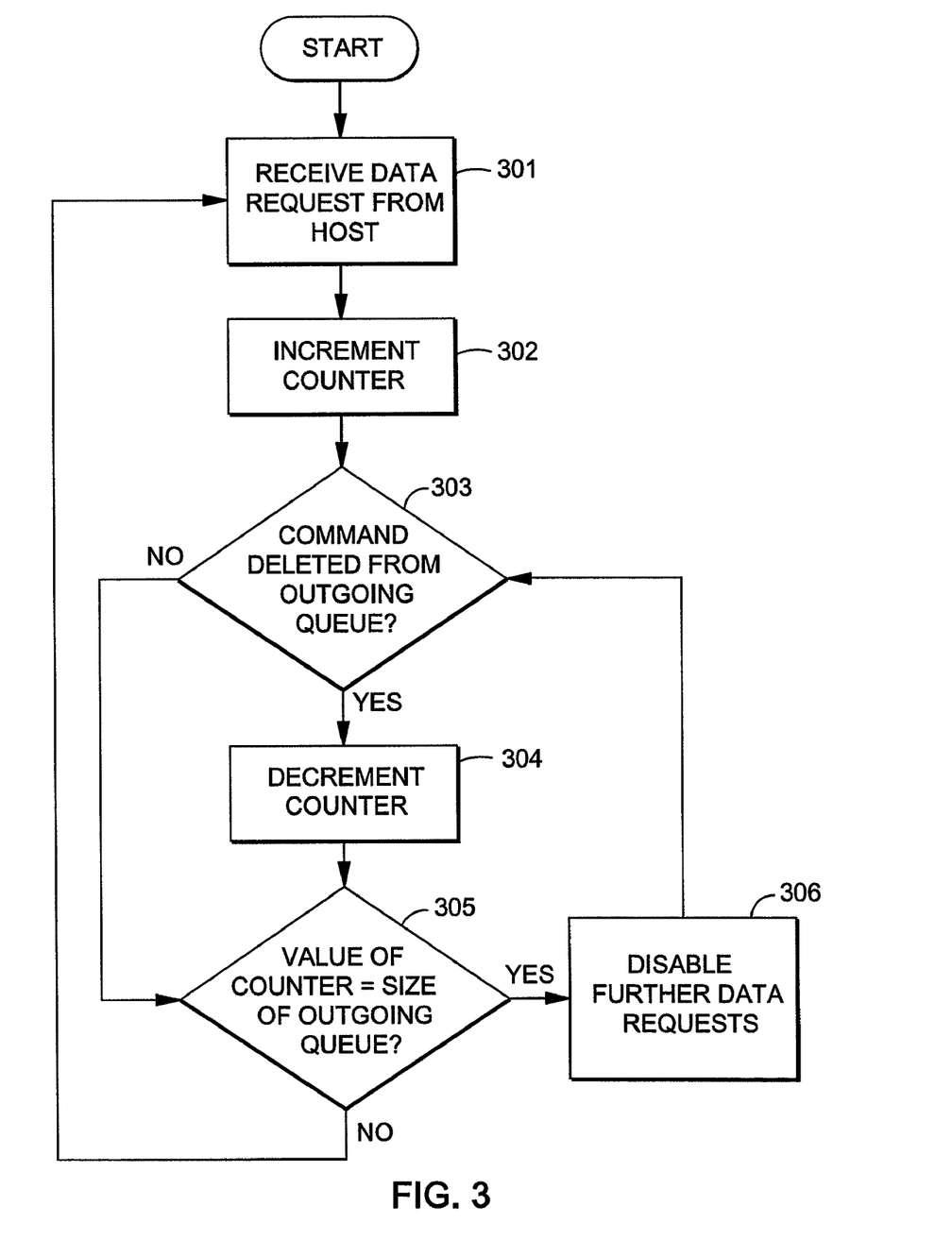
FIG. 3 is a flowchart illustrating a process of managing multiple data requests in accordance with one implementation.

As shown in FIG. 3, the process begins in step 301, where a data request is received from host 110.

In step 302, counter 114 is incremented in response to receipt of the data request. Thus, (in one implementation) each time a new data request is received from host 110, counter 114 is incremented by one.

In step 303, a determination is made whether a command has been deleted from outgoing queue 103. If so, counter 114 is decremented by one in step 304, and the process proceeds to step 305. If not, the process proceeds to step 305 without decrementing counter 114.

In step 305, a determination is made whether the value of counter 114 is greater than a size (or storage capacity) of outgoing queue 103. More specifically, outgoing queue 103 has a capacity to hold a maximum number of commands. Thus, this maximum number of commands is compared with the value of counter 114.

If the value of counter 114 is less than the maximum number of commands that can be stored in outgoing queue 103, then commands can continue to be executed from execution queue 101 as normal. Thus, the process proceeds back to step 301 and receives the next data request from the host 110.

Alternatively, if it is determined in step 305 that the value of counter 114 is equal to the maximum number of commands that can be stored in outgoing queue 103, further commands stored in execution queue 101 are disabled from being executed by separate control 106. For example, separate control 106 could temporarily disable an ALLOW REQUEST signal. Thus, no further commands progress to holding queue 102 from execution queue 101. This prevents any further commands from proceeding through to outgoing queue 103, which at this point has reached a maximum storage limit. The process then proceeds back to step 303 to determine if any commands have been deleted from outgoing queue 103, and the process repeats until a command is deleted from outgoing queue 103. Once a command is deleted from outgoing queue 103 (creating extra space in outgoing queue 103), the value of counter 114 is decremented, and thus the value of counter 114 drops below the maximum storage limit of outgoing queue 103. Then, since additional space has been made available in outgoing queue 103, the process proceeds back to step 301, where further commands can be executed from execution queue 101.

By virtue of the above arrangement, in which data requests are disabled based on the number of commands that have been received and the number of commands that have been deleted, it is possible to reduce overflow of in a queue command system with less need for significant additional control logic, registers, or buffers. Moreover, since the disabling of processing of data requests is based on the number of commands, each individual command does not need to be inspected, nor does each queue. Thus, management of the commands is faster, more efficient, and easier to debug than a conventional method.

Figure 4A:
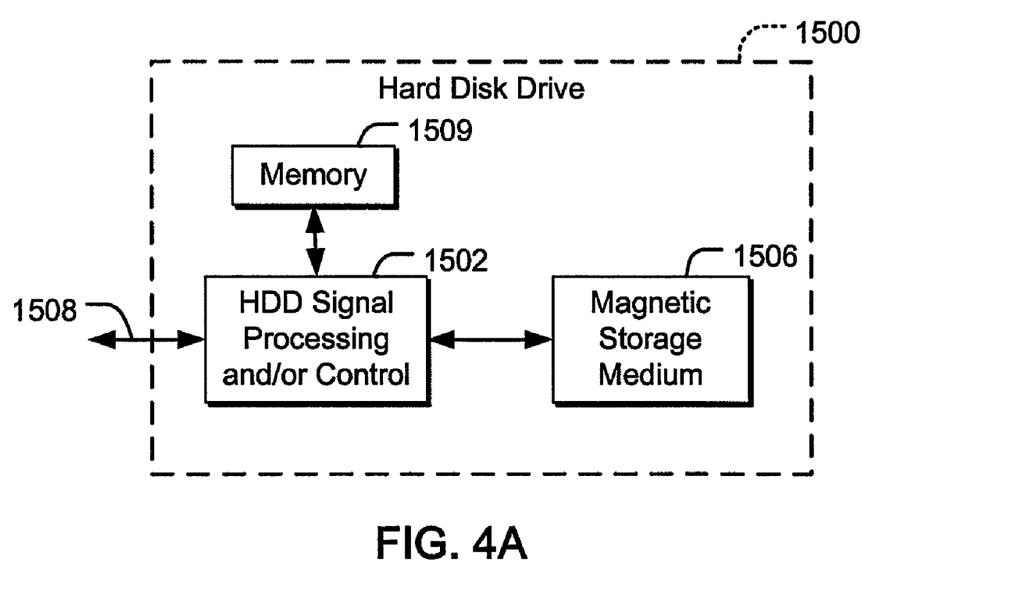
FIG. 4A is a block diagram showing an example embodiment in a hard disk drive (HDD).

Referring now to FIGS. 4A-4H, various exemplary implementations of the present invention are shown. Referring to FIG. 4A, the present invention may be embodied as a method of coordinating buffered data in a hard disk drive (HDD)

1500. The present invention may implement either or both signal processing and/or control circuits, which are generally identified in FIG. 4A at 1502. In some implementations, signal processing and/or control circuit 1502 and/or other circuits (not shown) in HDD 1500 may process data, perform coding and/or encryption, perform calculations, and/or format data that is output to and/or received from a magnetic storage medium 1506.

HDD 1500 may communicate with a host device (not shown) such as a computer, mobile computing devices such as personal digital assistants, cellular phones, media or MP3 players and the like, and/or other devices via one or more wired or wireless communication links 1508. HDD 1500 may be connected to memory 1509, such as random access memory (RAM), a low latency nonvolatile memory such as flash memory, read only memory (ROM) and/or other suitable electronic data storage.

Figure 4B:
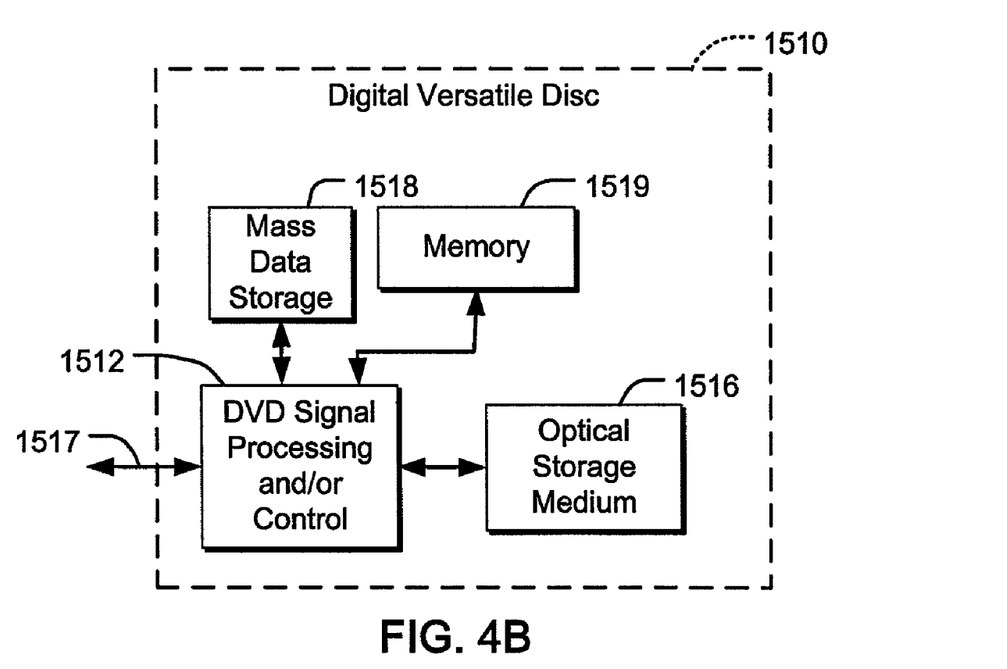
FIG. 4B is a block diagram of an example embodiment in a digital versatile disc (DVD) drive.

Referring now to FIG. 4B, the present invention may be embodied as a method of coordinating buffered data in a digital versatile disc (DVD) drive 1510. The present invention may implement either or both signal processing and/or control circuits, which are generally identified in FIG. 4B at 1512, and/or mass data storage 1518 of DVD drive 1510. Signal processing and/or control circuit 1512 and/or other circuits (not shown) in DVD drive 1510 may process data, perform coding and/or encryption, perform calculations, and/or format data that is read from and/or data written to an optical storage medium 1516. In some implementations, signal processing and/or control circuit 1512 and/or other circuits (not shown) in DVD drive 1510 can also perform other functions such as encoding and/or decoding and/or any other signal processing functions associated with a DVD drive.

DVD drive 1510 may communicate with an output device (not shown) such as a computer, television or other device via one or more wired or wireless communication links 1517. DVD drive 1510 may communicate with mass data storage 1518 that stores data in a nonvolatile manner. Mass data storage 1518 may include a hard disk drive (HDD) such as that shown in FIG. 4A. The HDD may be a mini HDD that includes one or more platters having a diameter that is smaller than approximately 1.8". DVD drive 1510 may be connected to memory 1519, such as RAM, ROM, low latency nonvolatile memory such as flash memory, and/or other suitable electronic data storage.

Figure 4C:
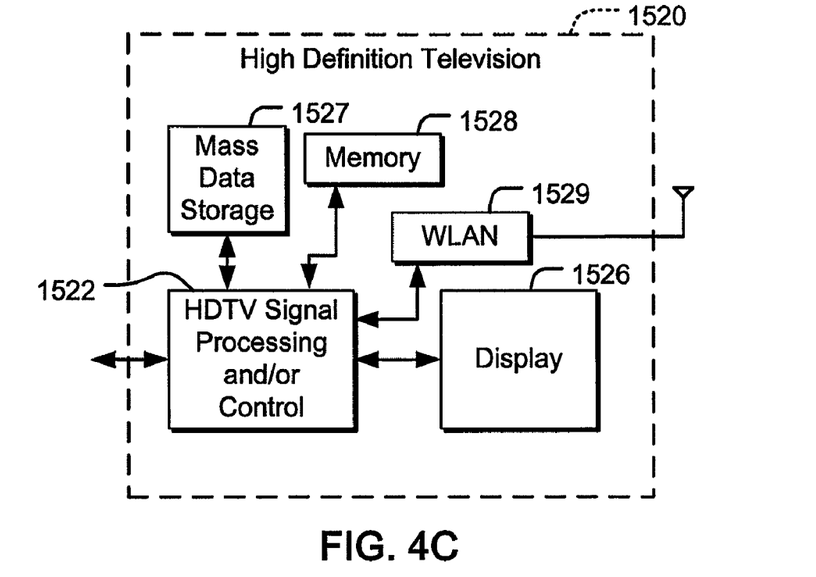
FIG. 4C is a block diagram of an example embodiment in a high definition television (HDTV).

Referring now to FIG. 4C, the present invention may be embodied as a method of coordinating buffered data in a high definition television (HDTV) 1520. The present invention may implement either or both signal processing and/or control circuits, which are generally identified in FIG. 4C at 1522, a WLAN network interface 1529 and/or mass data storage 1527 of the HDTV 1520. HDTV 1520 receives HDTV input signals in either a wired or wireless format and generates HDTV output signals for a display 1526. In some implementations, signal processing circuit and/or control circuit 1522 and/or other circuits (not shown) of HDTV 1520 may process data, perform coding and/or encryption, perform calculations, format data and/or perform any other type of HDTV processing that may be required.

HDTV 1520 may communicate with mass data storage 1527 that stores data in a nonvolatile manner such as optical and/or magnetic storage devices, for example, hard disk drives and/or DVD drives. At least one HDD may have the configuration shown in FIG. 4A and/or at least one DVD drive may have the configuration shown in FIG. 4B. The HDD may be a mini HDD that includes one or more platters having a diameter that is smaller than approximately 1.8". HDTV 1520 may be connected to memory 1528 such as RAM, ROM, low latency nonvolatile memory such as flash memory and/or other suitable electronic data storage. HDTV 1520 also may support connections with a WLAN via WLAN network interface 1529.

Figure 4D:
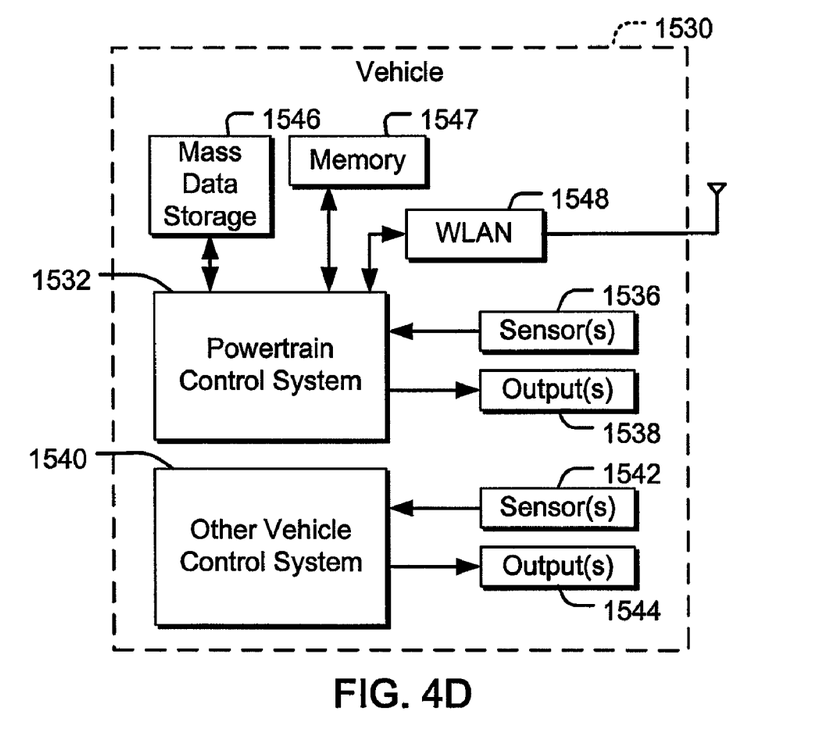
FIG. 4D is a block diagram of an example embodiment in a vehicle.

Referring now to FIG. 4D, the present invention may be embodied as a method of coordinating buffered data in a control system of a vehicle 1530, a WLAN network interface 1548 and/or mass data storage 1546 of vehicle 1530. In some implementations, the present invention implements a powertrain control system 1532 that receives inputs from one or more sensors such as temperature sensors, pressure sensors, rotational sensors, airflow sensors and/or any other suitable sensors and/or that generates one or more output control signals such as engine operating parameters, transmission operating parameters, braking parameters, and/or other control signals.

The present invention may also be embodied in an other control system 1540 of vehicle 1530. Control system 1540 may likewise receive signals from input sensors 1542 and/or output control signals to one or more output devices 1544. In some implementations, control system 1540 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

Powertrain control system 1532 may communicate with mass data storage 1546 that stores data in a nonvolatile manner. Mass data storage 1546 may include optical and/or magnetic storage devices, for example, hard disk drives and/or DVD drives. At least one HDD may have the configuration shown in FIG. 4A and/or at least one DVD drive may have the configuration shown in FIG. 4B. The HDD may be a mini HDD that includes one or more platters having a diameter that is smaller than approximately 1.8". Powertrain control system 1532 may be connected to memory 1547 such as RAM, ROM, low latency nonvolatile memory such as flash memory and/or other suitable electronic data storage. Powertrain control system 1532 also may support connections with a WLAN via WLAN network interface 1548. The control system 1540 may also include mass data storage, memory and/or a WLAN network interface (all not shown).

Figure 4E:
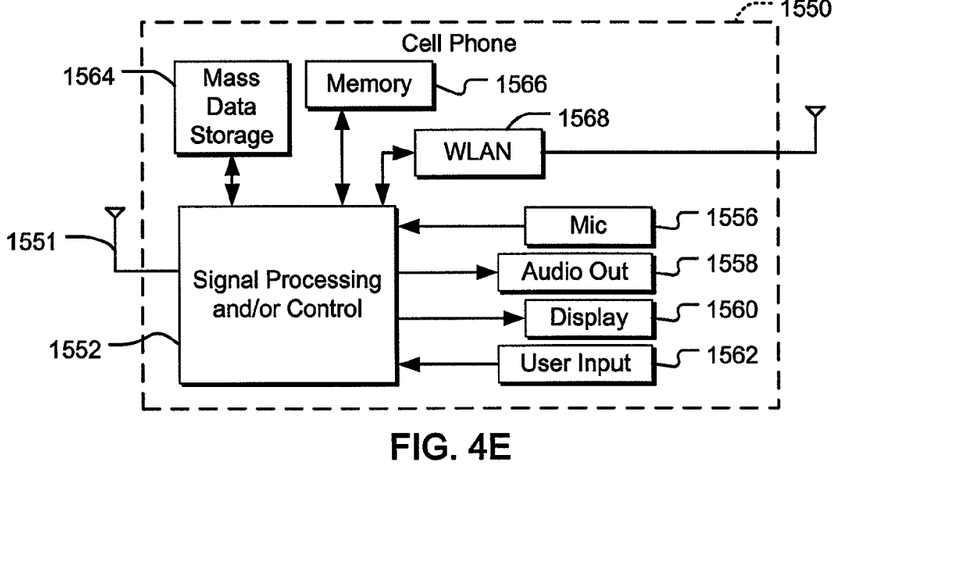
FIG. 4E is a block diagram of an example embodiment in a cellular or mobile phone.

Referring now to FIG. 4E, the present invention may be embodied as a method of coordinating buffered data in a cellular phone 1550 that may include a cellular antenna 1551. The present invention may implement either or both signal processing and/or control circuits, which are generally identified in FIG. 4E at 1552, a WLAN network interface 1568 and/or mass data storage 1564 of the cellular phone 1550. In some implementations, cellular phone 1550 includes a microphone 1556, an audio output 1558 such as a speaker and/or audio output jack, a display 1560 and/or an input device 1562 such as a keypad, pointing device, voice actuation and/or other input device. Signal processing and/or control circuits 1552 and/or other circuits (not shown) in cellular phone 1550 may process data, perform coding and/or encryption, perform calculations, format data and/or perform other cellular phone functions.

Cellular phone 1550 may communicate with mass data storage 1564 that stores data in a nonvolatile manner such as optical and/or magnetic storage devices for example hard disk drives and/or DVD drives. At least one HDD may have the configuration shown in FIG. 4A and/or at least one DVD drive may have the configuration shown in FIG. 4B. The HDD may be a mini HDD that includes one or more platters having a diameter that is smaller than approximately 1.8". Cellular phone 1550 may be connected to memory 1566 such as RAM, ROM, low latency nonvolatile memory such as flash memory and/or other suitable electronic data storage. Cellular phone 1550 also may support connections with a WLAN via WLAN network interface 1568.

Figure 4F:
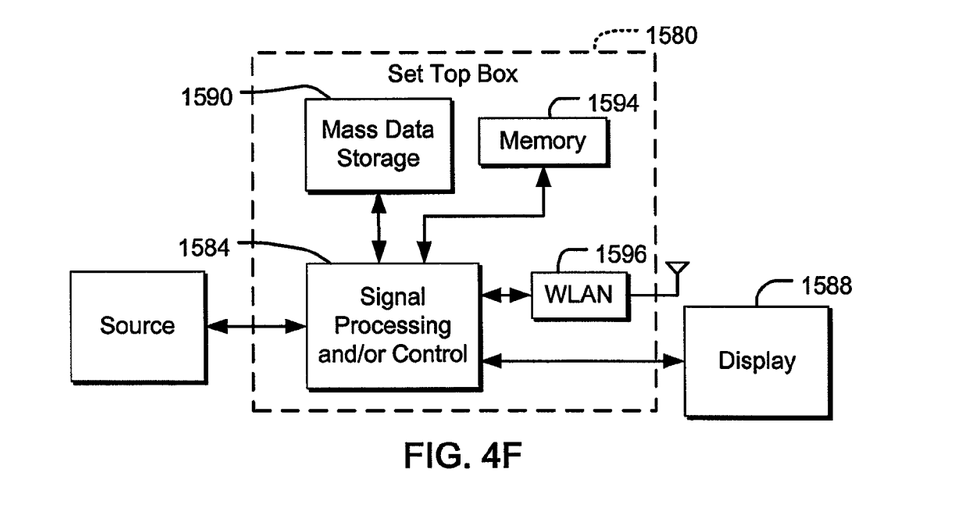
FIG. 4F is a block diagram of an example embodiment in a set-top box (STB).

Referring now to FIG. 4F, the present invention may be embodied as a method of coordinating buffered data in a set top box 1580. The present invention may implement either or both signal processing and/or control circuits, which are generally identified in FIG. 4F at 1584, a WLAN network interface 1596 and/or mass data storage 1590 of the set top box 1580. Set top box 1580 receives signals from a source such as a broadband source and outputs standard and/or high definition audio/video signals suitable for a display 1588 such as a television and/or monitor and/or other video and/or audio output devices. Signal processing and/or control circuits 1584 and/or other circuits (not shown) of the set top box 1580 may process data, perform coding and/or encryption, perform calculations, format data and/or perform any other set top box function.

Set top box 1580 may communicate with mass data storage 1590 that stores data in a nonvolatile manner. Mass data storage 1590 may include optical and/or magnetic storage devices, for example, hard disk drives and/or DVD drives. At least one HDD may have the configuration shown in FIG. 4A and/or at least one DVD drive may have the configuration shown in FIG. 4B. The HDD may be a mini HDD that includes one or more platters having a diameter that is smaller than approximately 1.8". Set top box 1580 may be connected to memory 1594 such as RAM, ROM, low latency nonvolatile memory such as flash memory and/or other suitable electronic data storage. Set top box 1580 also may support connections with a WLAN via WLAN network interface 1596.

Figure 4G:
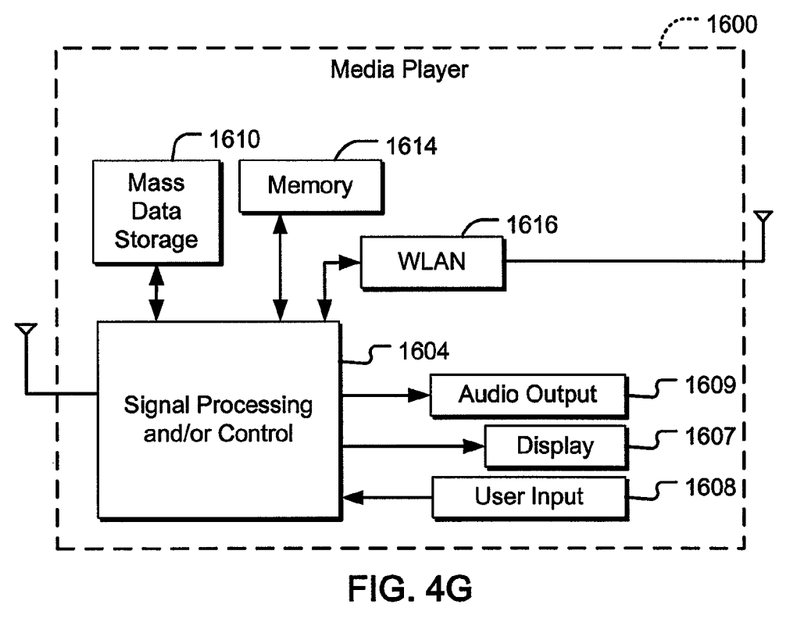
FIG. 4G is a block diagram of an example embodiment in a media player.

Referring now to FIG. 4G, the present invention may be embodied as a method of coordinating buffered data in a media player 1600. The present invention may implement either or both signal processing and/or control circuits, which are generally identified in FIG. 4G at 1604, a WLAN network interface 1616 and/or mass data storage 1610 of the media player 1600. In some implementations, media player 1600 includes a display 1607 and/or a user input 1608 such as a keypad, touchpad and the like. In some implementations, media player 1600 may employ a graphical user interface (GUI) that typically employs menus, drop down menus, icons and/or a point-and-click interface via display 1607 and/or user input 1608. Media player 1600 further includes an audio output 1609 such as a speaker and/or audio output jack. Signal processing and/or control circuits 1604 and/or other circuits (not shown) of media player 1600 may process data, perform coding and/or encryption, perform calculations, format data and/or perform any other media player function.

Media player 1600 may communicate with mass data storage 1610 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices, for example, hard disk drives and/or DVD drives. At least one HDD may have the configuration shown in FIG. 4A and/or at least one DVD drive may have the configuration shown in FIG. 4B. The HDD may be a mini HDD that includes one or more platters having a diameter that is smaller than approximately 1.8". Media player 1600 may be connected to memory 1614 such as RAM, ROM, low latency nonvolatile memory such as flash memory and/or other suitable electronic data storage. Media player 1600 also may support connections with a WLAN via WLAN network interface 1616. Still other implementations in addition to those described above are contemplated.

Figure 4H:
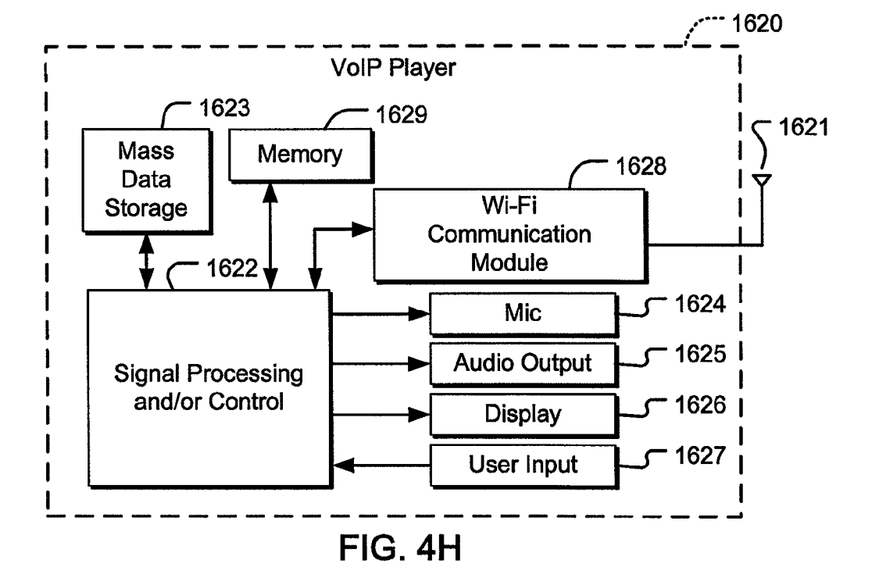
FIG. 4H is a block diagram of an example embodiment in a Voice-over Internet Protocol (VoIP) player.

Referring to FIG. 4H, the present invention may be embodied as a method of coordinating buffered data in a Voice over Internet Protocol (VoIP) player 1620 that may include an antenna 1621. The present invention may implement either or both signal processing and/or control circuits, which are generally identified in FIG. 4H at 1622, a wireless interface and/or mass data storage 1623 of the VoIP player 1620. In some implementations, VoIP player 1620 includes, in part, a microphone 1624, an audio output 1625 such as a speaker and/or audio output jack, a display monitor 1626, an input device 1627 such as a keypad, pointing device, voice actuation and/or other input devices, and a Wireless Fidelity (Wi-Fi) communication module 1628. Signal processing and/or control circuits 1622 and/or other circuits (not shown) in VoIP player 1620 may process data, perform coding and/or encryption, perform calculations, format data and/or perform other VoIP player functions.

VoIP player 1620 may communicate with mass data storage 1623 that stores data in a nonvolatile manner such as optical and/or magnetic storage devices, for example, hard disk drives and/or DVD drives. At least one HDD may have the configuration shown in FIG. 4A and/or at least one DVD drive may have the configuration shown in FIG. 4B. The HDD may be a mini HDD that includes one or more platters having a diameter that is smaller than approximately 1.8". VoIP player 1620 may be connected to memory 1629, which may be a RAM, ROM, low latency nonvolatile memory such as flash memory and/or other suitable electronic data storage. VoIP player 1620 is configured to establish communications link with a VoIP network (not shown) via Wi-Fi communication module 1628.

The invention has been described above with respect to particular illustrative example embodiments. It is understood that the invention is not limited to the above-described example embodiments and that various changes and modifications may be made without departing from the scope of the invention.

What is claimed is:

1. An apparatus for managing requests from a host for data stored in an external storage medium, the apparatus comprising:

an execution queue to store one or more commands to be executed, wherein each command stored in the execution queue corresponds to a given request from the host for data;

a holding queue to store one or more executed commands until receipt of an acknowledgment from the host, wherein the acknowledgement indicates that the host has received data corresponding to the executed command from the external storage medium;

an outgoing queue to store one or more acknowledged commands, the outgoing queue having a maximum storage limit;

a counter; and a separate logic block to increment a value of the counter when a command is stored in the execution queue;

decrement the value of the counter when an acknowledged command is deleted from the outgoing queue; and disable execution of commands stored in the execution queue when the value of the counter equals the maximum storage limit of the outgoing queue.

2. The apparatus according to claim 1, wherein each command stored in the execution queue comprises data pertaining to an amount of data blocks to obtain from the external storage medium and an address of the data blocks in the external storage medium.

3. The apparatus according to claim 1, wherein each command is assigned a unique exchange ID based on the host, and the unique exchange ID is not re-assigned to another command until the command is deleted from the outgoing queue.

4. The apparatus according to claim 1, wherein the separate logic block disables execution of commands by disabling an allowance signal that permits commands to execute.

5. The apparatus according to claim 1, wherein the separate logic block enables execution of the commands stored in the execution queue when the value of the counter is less than the maximum storage limit of the outgoing queue.

6. The apparatus according to claim 1, wherein the host comprises one or more of a computer, digital video recorder, digital audio player, personal digital assistant, digital camera, video game console, or mobile phone.

7. The apparatus according to claim 6, wherein the external storage device is integrated within the host.

8. The apparatus according to claim 1, wherein each of the execution queue, the holding queue, and the outgoing queue comprises a FIFO (First In, First Out) queue.

9. A method for managing requests from a host for data stored in an external storage medium using a queue command system, the queue command system comprising an execution queue, a holding queue, and an outgoing queue, the outgoing queue having a maximum storage limit, the method comprising:

loading one or more commands into to the execution queue, each command loaded in the execution queue corresponding to a given request from the host for data;

executing a command stored in the execution queue, including transferring the executed command into the holding queue, the holding queue to store the executed command until the host acknowledges receipt of data corresponding to the executed command;

transferring an acknowledged command from the holding queue to the outgoing queue upon the host acknowledging receipt of the data corresponding to the executed command;

deleting a command transferred into the outgoing queue in response to completion of a pre-determined action;

incrementing a value of a counter when a given command is loaded into the execution queue;

decrementing the value of the counter when a given command is deleted from the outgoing queue; and disabling execution of commands loaded in the execution queue when the value of the counter equals the maximum storage limit of the outgoing queue.

10. The method according to claim 9, wherein each command loaded into the execution queue comprises data pertaining to an amount of data blocks to obtain from the external storage medium and an address of the data blocks in the external storage medium.

11. The method according to claim 9, further comprising assigning a unique exchange ID to each command based on the host, wherein the unique exchange ID is not re-assigned to another command until the command is deleted from the outgoing queue.

12. The method according to claim 9, wherein disabling execution of commands loaded in the execution queue comprises disabling an allowance signal that permits the commands to be executed.

13. The method according to claim 9, further comprising enabling execution of commands loaded in the execution queue in response to the value of the counter being less than the maximum storage limit of the outgoing queue.

14. The method according to claim 9, wherein the host comprises one or more of a computer, digital video recorder, digital audio player, personal digital assistant, digital camera, video game console, or mobile phone.

15. The method according to claim 14, wherein the external storage device is integrated within the host.

16. The method according to claim 9, wherein each of the execution queue, the holding queue, and the outgoing queue comprises a FIFO (First In, First Out) queue.

* * * * *